(12) United States Patent
Lashkari et al.

(10) Patent No.: US 10,482,895 B2
(45) Date of Patent: Nov. 19, 2019

(54) ACOUSTIC ECHO CANCELLATION (AEC) RATE ADAPTATION

(71) Applicant: Cirrus Logic International Semiconductor Ltd., Edinburgh (GB)

(72) Inventors: Khosrow Lashkari, Palo Alto, CA (US); Justin Allen, Mesa, AZ (US)

(73) Assignee: Cirrus Logic, Inc., Austin, TX (US)

( * ) Notice: Subject to any disclaimer, the term of this patent is extended or adjusted under 35 U.S.C. 154(b) by 69 days.

(21) Appl. No.: 15/693,726

(22) Filed: Sep. 1, 2017

(65) Prior Publication Data

US 2019/0074025 A1  Mar. 7, 2019

(51) Int. Cl.
| | |
|---|---|
| H04B 3/23 | (2006.01) |
| H04M 9/08 | (2006.01) |
| G10L 15/22 | (2006.01) |
| G10K 11/178 | (2006.01) |
| G10L 21/0232 | (2013.01) |
| G10L 25/21 | (2013.01) |
| H04R 3/04 | (2006.01) |
| G10L 21/0208 | (2013.01) |
| G10L 25/51 | (2013.01) |
| G10L 21/0216 | (2013.01) |

(52) U.S. Cl.
CPC ...... G10L 21/0232 (2013.01); G10L 21/0208 (2013.01); G10L 25/21 (2013.01); H04B 3/23 (2013.01); H04M 9/082 (2013.01); H04R 3/04 (2013.01); G10L 25/51 (2013.01); G10L 2021/02082 (2013.01); G10L 2021/02163 (2013.01)

(58) Field of Classification Search
CPC ... G10L 21/0232; G10L 15/222; G10L 15/20; G10L 2021/02082; G10L 21/0208; G10L 25/51; G10K 11/17833; G10K 11/1783; H04B 3/234; H04B 3/23; H04M 9/082; H04R 3/04
USPC ....... 381/66, 71.11, 71.1; 370/286; 704/233, 704/E15.001
See application file for complete search history.

(56) References Cited

U.S. PATENT DOCUMENTS

| | | | |
|---|---|---|---|
| 8,983,057 B1 | 3/2015 | Deng et al. | |
| 2003/0174661 A1* | 9/2003 | Lee ....................... | H04M 9/082 370/286 |
| 2006/0147029 A1 | 7/2006 | Stokes et al. | |
| 2010/0057454 A1* | 3/2010 | Mohammad ........... | H04B 3/234 704/233 |

OTHER PUBLICATIONS

Ohta et al. "Acoustic echo cancellation using subadaptive filter", 2007 IEEE International Conference on Acoustics, Speech, and Signal Processing, Apr. 15-20, 2007.

* cited by examiner

Primary Examiner — Vivian C Chin
Assistant Examiner — Ubachukwu A Odunukwe
(74) Attorney, Agent, or Firm — Norton Rose Fulbright US LLP

(57) ABSTRACT

Step size can be used to slow or freeze the adaptive filter to improve AEC system performance, such as during double talk events. An AEC control system may be used to adjust the step size based on an echo-to-disturbance energy ratio (EDER). The algorithm adjusts the step size to lower the adaptation rate when the EDER is small (or the combination of the near signal and noise is large compared to the echo) and raise the adaptation rate when the EDER is large (echo is large compared to a combination of near signal and noise).

20 Claims, 5 Drawing Sheets

ACOUSTIC ECHO CANCELLATION (AEC) RATE ADAPTATION

FIELD OF THE DISCLOSURE

The instant disclosure relates to audio processing. More specifically, portions of this disclosure relate to acoustic echo cancellation (AEC).

BACKGROUND

Wireless telephones, such as mobile/cellular telephones and cordless telephones, and other consumer audio devices, such as mp3 players, are in widespread use. Performance of such devices with respect to audio intelligibility can be improved by providing noise canceling using a microphone. In noise cancellation, the microphone measures ambient acoustic events and then inserts an anti-noise signal into the output of the device to cancel the ambient acoustic events measured by the microphone. The acoustic environment around personal audio devices can change dramatically, depending on the sources of noise that are present and the position of the device itself. An adaptive noise cancellation (ANC) system may be employed to adapt the noise canceling to take into account environmental changes. However, some drawbacks are associated with conventional ANC systems.

A conventional AEC system is illustrated in FIG. 1. An AEC system 112 in a device receives input from a microphone, which receives noise, speech, and echoes from each active speaker of the device. The AEC system 112 also receives input signals corresponding to the audio signal driving the active speakers, which are correlated with the echoes received by the microphone. The AEC system 112 uses the input speaker signals to remove echoes from the input microphone signal to generate an output audio signal. An adaptive filter is controlled through filter coefficients to decouple the far-end signal of the speakers from a near-end signal of the microphone.

The presence of signals in the input microphone other than the far-end speaker signal inhibits operation of the adaptive filter. For example, the presence of both a near-end talker and a far-end talker can disrupt adaptation of the filter. Conventionally, a detector of near-end speech, called a double-talk detector (DTD), is used to control the AEC to prevent this disruption. A DTD 114 is coupled to the AEC system 112 to provide an adapt enable signal. When the DTD 114 detects this double-talker scenario, the DTD 114 instructions the AEC system 112 to stop adaptation of the filter. This halting of adaptation prevents the filter from diverging. However, DTDs present several problems. DTDs are often unreliable in correctly detecting a double talker scenario. Additionally, DTDs only offer a binary control to turn on or off the adaptation of the filter based on whether double talk is present or not. Furthermore, DTDs do not detect near-end noise, which can also cause the AEC to diverge.

Shortcomings mentioned here are only representative and are included simply to highlight that a need exists for improved electrical components, particularly for acoustic echo cancellation (AEC) systems employed in consumer-level devices, such as mobile phones. Embodiments described herein address certain shortcomings but not necessarily each and every one described here or known in the art. Furthermore, embodiments described herein may present other benefits than, and be used in other applications than, those of the shortcomings described above.

SUMMARY

Step size can be controlled to slow or freeze the adaptive filter to improve AEC system performance by preventing divergence during double talk events. An AEC control system may be used to adjust the step size based on an echo-to-disturbance energy ratio (EDER). The algorithm adjusts the step size to lower the adaptation rate when the EDER is small (or the combination of the near signal and noise is large compared to the echo) and raise the adaptation rate when the EDER is large (echo is large compared to a combination of near signal and noise).

A convergence detector may be used to adjust an operating mode of the AEC system and change how the algorithm adjusts the step size of the AEC system. The AEC system may have two modes of operation, acquisition mode and maintenance mode. The AEC is in acquisition mode when the adaptive filter is not converged. During this time, the control algorithm is not used and the step size of the adaptation process may be constant. When the AEC is converged, the adaptive filter may be operated in a maintenance mode, and the control algorithm may automatically adjust the adaptation rate in relation to the EDER. The maintenance mode allows the AEC to continuously adapt during double talk and other noise without significant divergence, and to re-adapt quickly after a path change.

One embodiment of an AEC system according to aspects of this disclosure includes an adaptive filter configured to modify an input microphone signal based on a plurality of filter coefficients to obtain an echo-cancelled output signal; and a step size controller coupled to the adaptive filter and configured to adjust an adaptation rate of the adaptive filter based on an echo-to-disturbance energy ratio metric, computed from the input microphone signal, the echo-cancelled output signal, and a desired Echo Return Loss Enhancement (ERLE). The ERLE value is representative of an amount of echo cancellation desired from the AEC or other echo cancelling block, and may be referred to as an echo suppression ratio or echo reduction level. The step size controller may be configured to adjust the step size by decreasing or increasing the step size in relation the echo-to-disturbance energy ratio metric. In some embodiments, the AEC system may include a convergence detector coupled to the adaptive filter and coupled to the step size controller, wherein the step size controller is configured to disable adjusting of the adaptation rate of the adaptive filter when the convergence detector determines the adaptive filter is not converged. The convergence detector may be coupled to outputs of a plurality of filter taps of the adaptive filter, and wherein the convergence detector determines the adaptive filter is not converged by comparing a ratio of outputs from a first set of the plurality of filter taps with outputs from a second set of the plurality of filter taps of the adaptive filter Electronic devices incorporating the AEC system described above may benefit from improved audio processing such as through clearer telephone calls and voice recordings, and improved ASR (automatic speech recognition) performance. The electronic devices may include an analog-to-digital converter (ADC). The ADC may be used to convert an analog signal, such as an audio signal from a microphone, to a digital representation of the analog signal. The AEC system and components implementing aspects of the described AEC system may be used in electronic devices with audio capability, such as music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, and the like.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
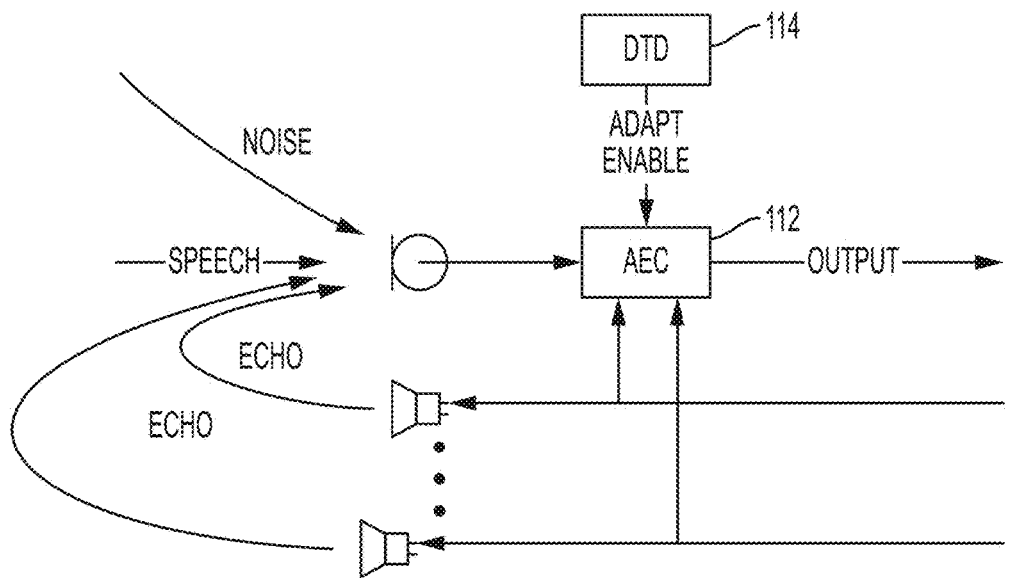
FIG. 1 is a block diagram illustrating a conventional acoustic echo cancellation (AEC) system with double-talk detection.
Figure 2:
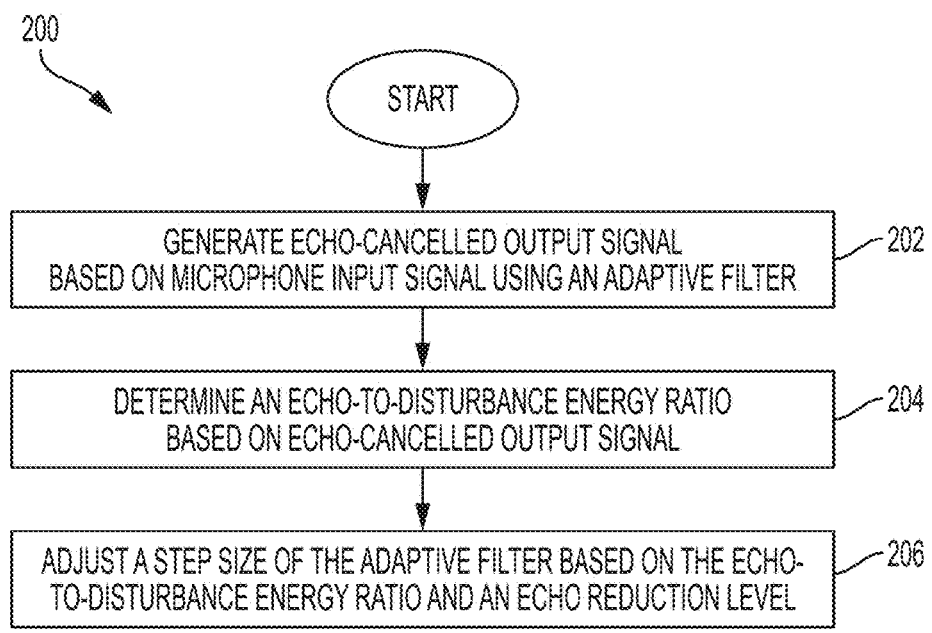
FIG. 2 is a flow chart illustrating an example method for controlling adaptation of a filter of an acoustic echo cancellation (AEC) system based on an echo-to-disturbance energy ratio and desired ERLE according to some embodiments of the disclosure.

FIG. 2 is a flow chart illustrating an example method for controlling adaptation of a filter of an acoustic echo cancellation (AEC) system based on an echo-to-disturbance energy ratio according to some embodiments of the disclosure. A method 200 begins at block 202 with generating an echo-cancelled output signal based on a microphone input signal using an adaptive filter. The echo-cancelled output signal is an output of the AEC system and includes the desired speech from the microphone signal. The echo-cancelled output signal is obtained by processing the input microphone signal through an adaptive filter operating based on filter coefficients. The adaptive filter changes over time based on the echo-cancelled output signal. The rate of change of coefficients of the adaptive filter in response to the echo-cancelled output signal can be controlled by a step size parameter. At block 204, an echo-to-disturbance energy ratio (EDER) may be determined based on the echo-cancelled output signal, such as by comparing the echo-cancelled output signal to the microphone input signal. The determination at block 204 may be performed without a dedicated microphone that provides the disturbance signal. At block 206, the step size of the adaptive filter is adjusted based on the EDER determined at block 204.

Figure 3:
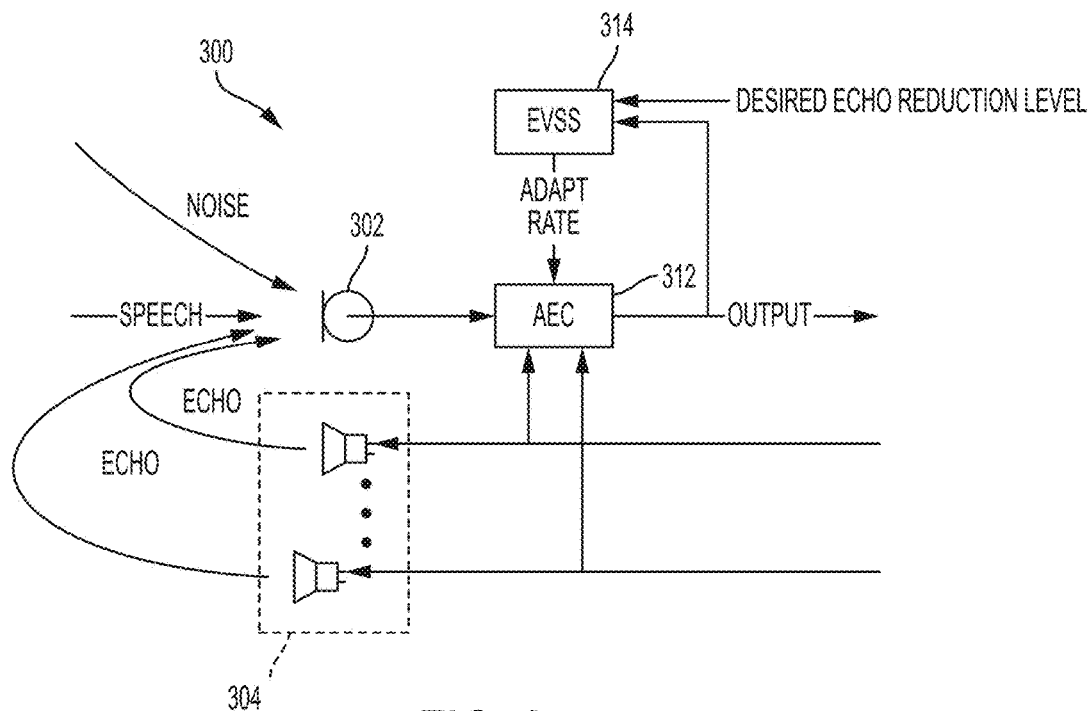
FIG. 3 is a block diagram illustrating an acoustic echo cancellation (AEC) system with ESNR-based variable step size (EVSS) control according to some embodiments of the disclosure.

A block diagram for an AEC system implementing the processing described in FIG. 2 is shown in FIG. 3. FIG. 3 is a block diagram illustrating an acoustic echo cancellation (AEC) system with ESNR-based variable step size (EVSS) control according to some embodiments of the disclosure. An AEC system 300 includes an AEC processing block 312, which may include an adaptive filter. The processing block 312 may receive signals from the microphone 302 and speakers 304. The adaptive filter of the processing block 312 adjusts filter coefficients to obtain an echo-cancelled output signal that removes unwanted signals. The echo-cancelled output and the microphone signal are provided to EVSS processing block 314. Processing block 314 generates a step size adaptation rate signal for controlling the AEC processing block 312. The adaptation rate signal is used to adjust a rate of adaptation of the filter in AEC processing block 312, such as updating a step size for evolution of the filter coefficients in response to the echo-cancelled output signal.

Figure 4:
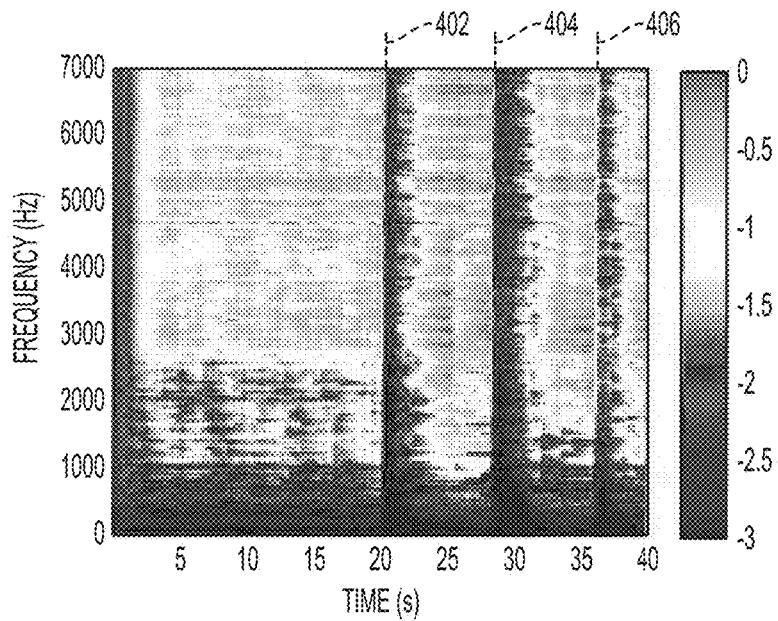
FIG. 4 is a graph illustrating step size adjustments in an acoustic echo cancellation (AEC) system with ESNR-based variable step size (EVSS) control in response to barge-in talkers according to some embodiments of the disclosure.

The adjustment of the step size for the adaptive filter may be based on the echo-to-disturbance energy ratio (EDER) and a desired echo reduction level (ERLE). The processing block 314 may adjust the step size to lower the adaptation rate when the EDER is low and raise the adaptation rate when the EDER is large. For example, the processing block 314 may slow or halt the adaptation rate when a barge-in talker creates a double-talk event during operation of the AEC processing block 312. An example operation of the AEC system 300 is shown in FIG. 4. FIG. 4 is a graph illustrating step size adjustments in an acoustic echo cancellation (AEC) system with ESNR-based variable step size (EVSS) control in response to barge-in talkers according to some embodiments of the disclosure. The graph illustrates step size for the adaptive filter as a function of frequency over time processing an input signal. A barge-in talker appears in the input microphone signal at times 402, 404, and 406. The barge-in talker changes the EDER of the echo-cancelled output signal and the EVSS processing block 314 responds by decreasing the adaptation rate of the filter at each of times 402, 404, and 406. That decrease in step size is shown by the decrease in adaptation rate at values across all frequencies at times 402, 404, and 406. The decrease in adaptation rate slows the adaptation to prevent divergence of the adaptive filter because of the barge-in talker.

In one embodiment, an adapted step size $\mu_{EVSS}$ determined by the EVSS processing block 414 may be given by $$\mu_{EVSS}(t) = \frac{\mu}{1 + \frac{R}{esnr(t)}}.$$

where parameter R is related to the desired echo reduction level (ERLE). The R parameter may be a factor that optimizes the tradeoff between convergence speed and convergence depth. Convergence depth refers to refer to the closeness of the solution achieved to an optimal solution (e.g., perfect echo cancellation). The step size $\mu_{EVSS}$ controls the speed of convergence, but may be used to control the depth of convergence. A small step size will converge slowly, but more deeply. A large step size will converge faster but not as deep. A trade-off can be made by adjusting R to an appropriate value. The variable step size of the AEC system may thus be optimized for a convergence depth (and conversely for a convergence speed) depending on the R parameter. The R value may be determined heuristically and pre-programmed into the AEC system (one possible value for R is 41), and esnr(t) may be determined from following equation:

$$esnr(t) = \frac{P_{in} - P_{out}}{P_{out}},$$

where $$P_{in}(n) = \lambda P_{in}(n-1) + (1-\lambda) \sum_{k=0}^{numTaps} d^2(n,k)$$

and $$P_{out}(n) = \lambda P_{out}(n-1) + (1-\lambda) \sum_{k=0}^{numTaps} e^2(n,k),$$

where values for the $\lambda$ may be determined heuristically and pre-programmed into the AEC system (one possible value for $\lambda$ is 0.9). By combining these equations, the step size calculation can be written as:

$$\mu_{EVSS} = \frac{\mu(P_{in} - P_{out})}{P_{in} + (R-1)P_{out}}.$$

Figure 5:
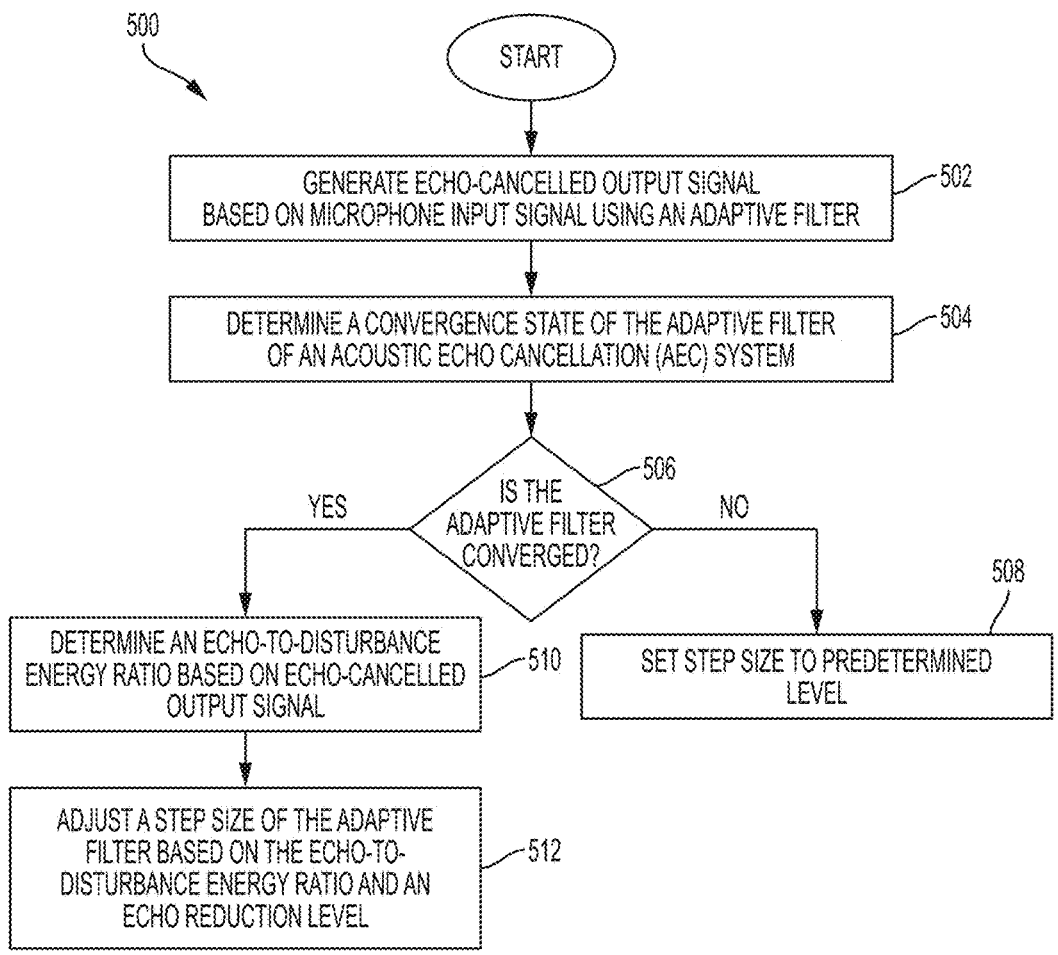
FIG. 5 is a flow chart illustrating an example method for controlling adaptation of a filter of an acoustic echo cancellation (AEC) system based on an echo-to-disturbance energy ratio and filter convergence state according to some embodiments of the disclosure.

A convergence detector may also be used to control an adaptation rate of the AEC system. A method for adapting a filter based on convergence detection is shown in FIG. 5. FIG. 5 is a flow chart illustrating an example method for controlling adaptation of a filter of an acoustic echo cancellation (AEC) system based on an echo-to-disturbance energy ratio and filter convergence state according to some embodiments of the disclosure. A method 500 begins at block 502 with generating an echo-cancelled output signal based on a microphone input signal using an adaptive filter, similar to block 202 of FIG. 2. At block 504, a convergence state is determined for the adaptive filter. At block 506, it is determined whether the adaptive filter is sufficiently converged. If not, the step size for the adaptive filter may be set to a predetermined level. If the adaptive filter is converged, then the method 500 proceeds to block 510 to determine an echo-to-disturbance energy ratio (EDER) based on the echo-cancelled output signal generated at block 502. At block 512, the step size is calculated from the EDER estimation and the desired ERLE.

Figure 6:
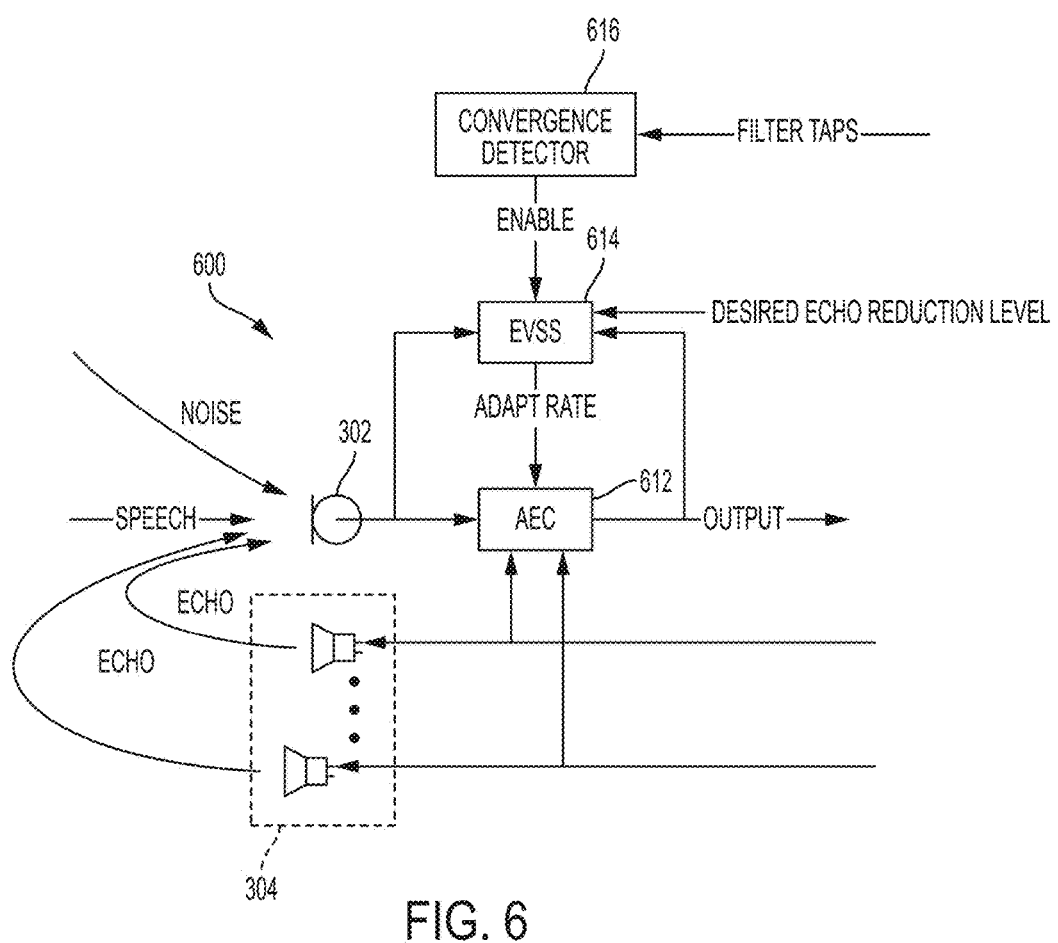
FIG. 6 is a block diagram illustrating an acoustic echo cancellation (AEC) system with ESNR-based variable step size (EVSS) control and a convergence detector according to some embodiments of the disclosure.

A block diagram for an AEC system implementing the processing described in FIG. 5 is shown in FIG. 6. FIG. 6 is a block diagram illustrating an acoustic echo cancellation (AEC) system with ESNR-based variable step size (EVSS) control and a convergence detector according to some embodiments of the disclosure. An AEC system 600 includes an AEC processing block 612, similar to block 412 of FIG. 4. An EVSS processing block 614 provides an adapt rate signal to the AEC processing block 612. The EVSS processing block 614 may control the AEC processing block 612 based on an echo-to-disturbance energy ratio (EDER) determined from the input microphone signal and the echo-cancelled output signal. The processing block 614 may also control the AEC processing block 612 based on a signal from a convergence detector 616. The detector 616 receives outputs from a plurality of taps of the adaptive filter in the AEC processing block 612. The detector 616 may output an enable signal to the EVSS processing block 614 based on the convergence state of the adaptive filter. When the adaptive filter is not converged, the process of updating the adaptation rate using the EVSS processing block 614 may be disabled.

The convergence detector 616 may determine if the adaptive filter is sufficiently converged by measuring a flatness of the ratio of a second half of an estimated impulse response to a first half of the impulse response. The ratio may be calculated as:

$$\text{ratio}(n) = \lambda \text{ratio}(n-1) + (1-\lambda)\frac{\sum_{k=K/2}^{K-1} h^2(k)}{\sum_{k=0}^{K/2-1} h^2(k)},$$

where h is the impulse response and K is the number of taps of the adaptive filter.

An AEC system with an adjustable rate based on the echo-to-disturbance energy ratio reduces undesirable divergence of the adaptive filter in response to events such as barge-in talkers. In one embodiment of such an AEC system, a false rejection rate (FFR) of 10% was measured at an SNR of 7 dB for the system without barge-in and an FFR of 10% was achieved at −19 dB for the barge-in algorithm, which is an improvement of 26 dB.

Figure 7:
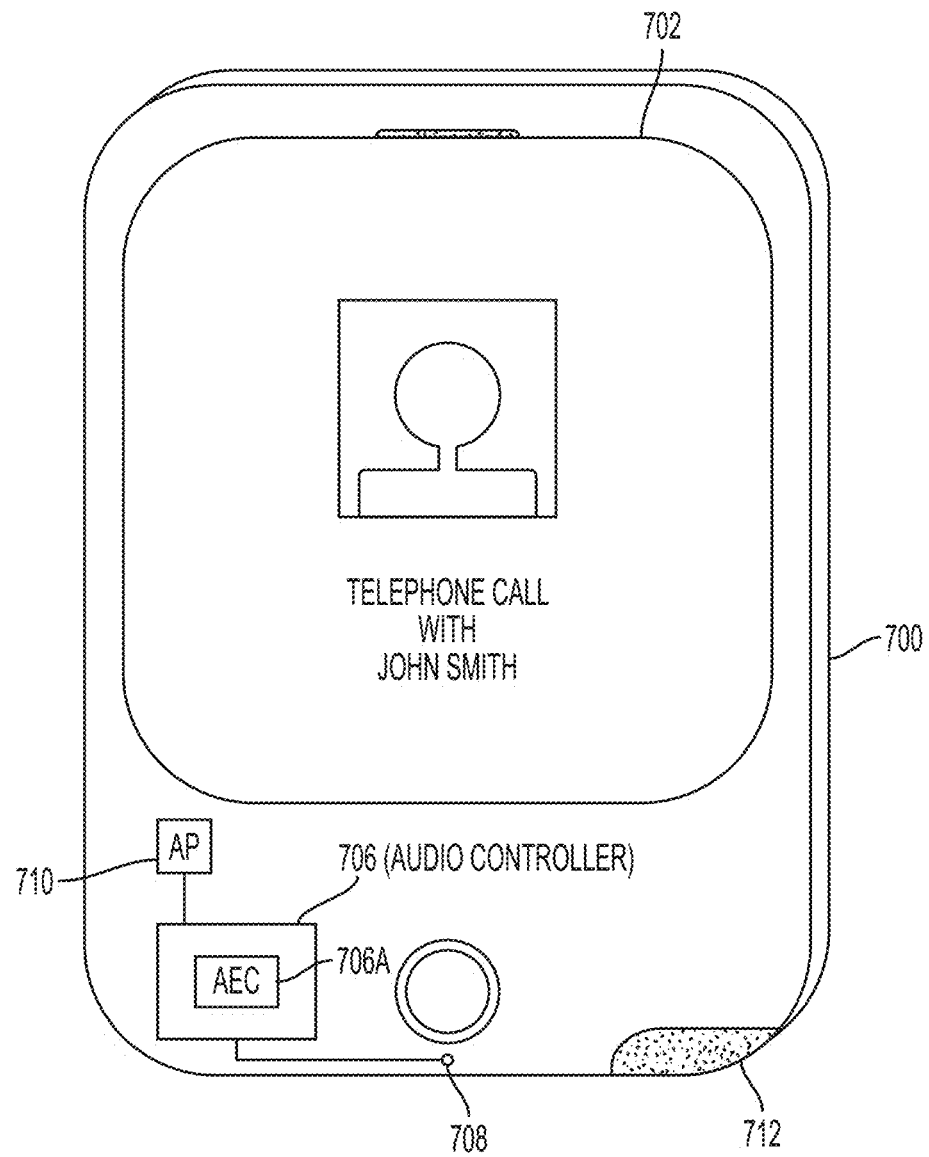
FIG. 7 is an illustration showing an example personal media device with an acoustic echo cancellation (AEC) system with ESNR-based variable step size (EVSS) control according to one embodiment of the disclosure.

One advantageous embodiment for an audio processor described herein is a mobile device configured for recording audio, making telephone calls, video chatting, and/or other activities involving processing microphone input. FIG. 7 is an illustration showing an example mobile device for audio playback including an audio controller that is configured to reduce distortion in reproduced audio according to one embodiment of the disclosure. A mobile device 700 may include a display 702 for allowing a user to select a contact to dial. Speech received from a telephone call or video call is provided to an audio controller 706. The audio controller 706 may include an acoustic echo cancellation (AEC) system 706A. The acoustic echo cancellation (AEC) system 706A may implement audio processing to modify an input audio signal, such as according to the embodiments of FIG. 2, FIG. 3, FIG. 4, FIG. 5, or FIG. 6. The echo cancellation of system 706A may be useful, for example, during speakerphone calls involving speaker 712. Other data received at the audio controller 706 may be as received from sources such as a USB connection, Wi-Fi, cellular radio, another wireless radio, and/or a wired connection. The output of the audio controller 706, such as an echo-cancelled output signal, may be provided to an application processor (AP) 710 of the mobile device 700 for further processing, such as transmission of speech for a telephone call or recording of the speech for later playback. The output of the audio controller 706 may be configured as an analog or a digital signal through the use of an appropriate converter.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations. In some embodiments, the integrated circuit (IC) that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The described methods are generally set forth in a logical flow of steps. As such, the described order and labeled steps of representative figures are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, where processing steps are described as implemented on certain circuitry such as digital signal processors (DSPs), the processing may be executed by other types of processors, such as graphics processing units (GPUs) and central processing units (CPUs). As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for echo cancellation in an audio system having a transducer and a microphone, comprising:
    generating an echo-cancelled output signal from a microphone input signal and a transducer output signal, wherein the echo-cancelled output signal is generated using an adaptive filter;
    determining an echo-to-disturbance energy ratio by comparing an energy of the microphone input signal and an energy of the echo-cancelled output signal; and
    adjusting a step size of the adaptive filter used to converge on the echo-cancelled output signal based, at least in part, on the echo-to-disturbance energy ratio, wherein the step size is an echo-signal-to-noise-ratio (ESNR)-based variable step size (EVSS) $\mu_{ESNR}$ computed according to:

$$\mu_{EVSS} = \frac{\mu(P_{in} - P_{out})}{P_{in} + (R-1)P_{out}}.$$

2. The method of claim 1, further comprising:
    detecting convergence of the adaptive filter; and
    performing the step of adjusting the step size based on a convergence state of the adaptive filter.

3. The method of claim 2, wherein the step of detecting convergence of the adaptive filter comprises comparing a ratio of outputs from a first set of filter taps of the adaptive filter with outputs from a second set of filter taps of the adaptive filter.

4. The method of claim 3, wherein the step of detecting convergence of the adaptive filter comprises determining a flatness of the ratio.

5. The method of claim 1, wherein the step of determining the echo-to-disturbance energy ratio comprises:
   determining an energy of the microphone input signal; and
   determining an energy of the echo-cancelled output signal.

6. The method of claim 1, wherein the step of adjusting the step size is based, at least in part, on a desired echo reduction level.

7. The method of claim 1, wherein the step of generating the echo-cancelled output signal is performed without double-talk detection.

8. The method of claim 1, wherein the step of adjusting the step size comprises adjusting the step size in proportion to the echo-to-disturbance energy ratio.

9. An apparatus, comprising:
   an audio controller configured to perform steps comprising:
      generating an echo-cancelled output signal from a microphone input signal and a transducer output signal, wherein the echo-cancelled output signal is generated using an adaptive filter;
      determining an echo-to-disturbance energy ratio by comparing an energy of the microphone input signal and an energy of the echo-cancelled output signal; and
      adjusting a step size of the adaptive filter used to converge on the echo-cancelled output signal based, at least in part, on the echo-to-disturbance energy ratio, wherein the step size is an echo-signal-to-noise-ratio (ESNR)-based variable step size (EVSS) $\mu_{ESNR}$ computed according to:

$$\mu_{EVSS} = \frac{\mu(P_{in} - P_{out})}{P_{in} + (R-1)P_{out}}.$$

10. The apparatus of claim 9, wherein the audio controller is further configured to perform steps comprising:
    detecting convergence of the adaptive filter; and
    performing the step of adjusting the step size based on a convergence state of the adaptive filter.

11. The apparatus of claim 10, wherein the audio controller is configured to detect convergence of the adaptive filter by comparing a ratio of outputs from a first set of filter taps of the adaptive filter with outputs from a second set of filter taps of the adaptive filter.

12. The apparatus of claim 11, wherein the audio controller is configured to detect convergence of the adaptive filter by determining a flatness of the ratio.

13. The apparatus of claim 9, wherein the audio controller is configured to determine the echo-to-disturbance energy ratio by:
    determining an energy of the microphone input signal; and
    determining an energy of the echo-cancelled output signal.

14. The apparatus of claim 9, wherein the audio controller is configured to adjust the step size is based, at least in part, on a desired echo reduction level.

15. The apparatus of claim 9, wherein the audio controller is configured to generate the echo-cancelled output signal without a double-talk detector.

16. The apparatus of claim 9, wherein the audio controller is configured to adjust the step size by adjusting the step size in proportion to the echo-to-disturbance energy ratio.

17. An acoustic echo cancellation (AEC) system, comprising:
    an adaptive filter configured to modify an input microphone signal based on a plurality of filter coefficients to obtain an echo-cancelled output signal;
    a step size controller coupled to the adaptive filter and configured to adjust an adaptation rate of the adaptive filter based, at least in part, on an echo-to-disturbance energy ratio computed from the input microphone signal, the echo-cancelled output signal, and a desired echo reduction level, wherein the adaptation rate is based on a step size that is an echo-signal-to-noise-ratio (ESNR)-based variable step size (EVSS) $\mu_{ESNR}$ computed according to:

$$\mu_{EVSS} = \frac{\mu(P_{in} - P_{out})}{P_{in} + (R-1)P_{out}}.$$

18. The acoustic echo cancellation (AEC) system of claim 17, wherein the step size controller is configured to adjust the step size by adjusting the step size in proportion to the echo-to-disturbance energy ratio.

19. The acoustic echo cancellation (AEC) system of claim 17, further comprising a convergence detector coupled to the adaptive filter and coupled to the step size controller, wherein the step size controller is configured to disable adjusting of the adaptation rate of the adaptive filter when the convergence detector determines the adaptive filter is not converged.

20. The acoustic echo cancellation (AEC) system of claim 19, wherein the convergence detector is coupled to outputs of a plurality of filter taps of the adaptive filter, and wherein the convergence detector determines the adaptive filter is not converged by comparing a ratio of outputs from a first set of the plurality of filter taps with outputs from a second set of the plurality of filter taps of the adaptive filter.

* * * * *